(12) United States Patent
Willis et al.

(10) Patent No.: US 9,782,934 B2
(45) Date of Patent: Oct. 10, 2017

(54) 3D PRINT ADHESION REDUCTION DURING CURE PROCESS

(71) Applicant: Autodesk, Inc., San Rafael, CA (US)

(72) Inventors: Karl Willis, Millbrae, CA (US); Eric Jamesson Wilhelm, Oakland, CA (US); Pierre Pascal Anatole Lin, London (GB); Arian Aziz Aghababaie, London (GB); Qiang Zheng, Palo Alto, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/711,703

(22) Filed: May 13, 2015

(65) Prior Publication Data

US 2015/0360419 A1    Dec. 17, 2015

Related U.S. Application Data (60) Provisional application No. 61/992,597, filed on May 13, 2014.

(51) Int. Cl.
*B29C 67/00* (2017.01)
*B29K 105/00* (2006.01)
(Continued)

(52) U.S. Cl.
CPC ...... *B29C 67/0085* (2013.01); *B29C 67/0066* (2013.01); *B29K 2105/0002* (2013.01);
(Continued)

(58) Field of Classification Search
CPC ............ B29C 67/0051; B29C 67/0055; B29C 67/0062; B29C 67/006; B29C 67/007; B29C 67/0085; B29C 67/0088
See application file for complete search history.

(56) References Cited

U.S. PATENT DOCUMENTS

| 5,137,662 A | 8/1992 | Hull et al. |
|---|---|---|
| 9,120,270 B2 | 9/2015 | Chen et al. |

(Continued)

FOREIGN PATENT DOCUMENTS

| CN | 104890245 A | * 9/2015 |
|---|---|---|
| WO | WO 2014/126830 | 8/2014 |

OTHER PUBLICATIONS

Dendukuri et al., "Continuous-flow lithography for high-throughput microparticle synthesis," Nature Materials, vol. 5, May 2006, pp. 365-369, © 2006 Nature Publishing Group.

(Continued)

*Primary Examiner* — Ryan Ochylski
(74) *Attorney, Agent, or Firm* — Fish & Richardson P.C.

(57) ABSTRACT

Methods, systems, and apparatus include computer programs encoded on a computer-readable storage medium, including a system for reducing adhesion during cure processing for a stereolithographic 3D printed object. The system includes resin tank for maintaining a liquid photopolymer resin. The system further includes a light source. The system further includes controller for selectively exposing the liquid photopolymer resin to form a solid object in the resin tank. The resin tank is constructed of a rigid material that has an oxygen permeability that is above a first threshold so as to reduce a separation force required to remove the solid object from the resin tank after curing.

15 Claims, 5 Drawing Sheets

(51) Int. Cl.
   *B33Y 30/00* (2015.01)
   *B33Y 10/00* (2015.01)

(52) U.S. Cl.
   CPC .. *B29K 2105/0058* (2013.01); *B29K 2827/18* (2013.01); *B33Y 10/00* (2014.12); *B33Y 30/00* (2014.12)

(56) References Cited

U.S. PATENT DOCUMENTS

| | | | |
|---|---|---|---|
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,360,757 B2 | 6/2016 | DeSimone et al. | |
| 9,367,049 B2* | 6/2016 | Jariwala | B29C 67/0066 |
| 2006/0054039 A1* | 3/2006 | Kritchman | B29C 41/48 101/424.1 |
| 2007/0264481 A1 | 11/2007 | DeSimone et al. | |
| 2009/0196946 A1* | 8/2009 | Kihara | B29C 67/0066 425/171 |
| 2010/0028994 A1 | 2/2010 | DeSimone et al. | |
| 2011/0182805 A1 | 7/2011 | DeSimone et al. | |
| 2013/0123988 A1* | 5/2013 | Jariwala | B29C 67/0066 700/266 |
| 2013/0252178 A1 | 9/2013 | McLeod et al. | |
| 2013/0336884 A1 | 12/2013 | DeSimone et al. | |
| 2014/0339741 A1 | 11/2014 | Aghababaie et al. | |
| 2015/0072293 A1 | 3/2015 | DeSimone et al. | |
| 2015/0097315 A1 | 4/2015 | DeSimone et al. | |
| 2015/0097316 A1 | 4/2015 | DeSimone et al. | |
| 2015/0102532 A1 | 4/2015 | DeSimone et al. | |
| 2015/0328839 A1 | 11/2015 | Willis et al. | |
| 2015/0331402 A1 | 11/2015 | Lin et al. | |
| 2016/0067921 A1 | 3/2016 | Willis et al. | |
| 2016/0200052 A1* | 7/2016 | Moore | B29C 67/0092 264/401 |
| 2016/0303795 A1* | 10/2016 | Liu | B29C 67/0085 |
| 2017/0087769 A1* | 3/2017 | Lancaster-Larocque | B29C 67/0066 |

OTHER PUBLICATIONS

Lambert et al., "Design considerations for mask projection microstereolithography systems," (Jun. 22, 2016) [online] (retrieved from http://sffsvmposium.engr.utexas.edu/Manuscripts/2013/2013-09-Lambert.pdf), 20 pages.

Massey, L. *Permeability Properties of Plastics and Elastomers—A Guide to Packaging and Barrier Materials*. Published Jan. 1, 2003. pp. 1-5, 19-29.

Pan et al., "Rapid manufacturing in minutes: the development of a mask projection stereolithography process for high-speed fabrication," Proceedings of the ASME 2012 International Manufacturing Science and Engineering Conferences, Jun. 4-8, 2012, Notre Dame, Indiana, US, 10 pages.

Pinnau and Toy, "Gas and vapor properties of amorphous perfluorinated copolymer membranes based on 2,2-bistrifluoromethy1-4,5-difluoro-1,3-dioxole/tetrafluoroethylene," Journal of Membrane Science, 109:125-133 (1996).

Unknown author, "Teflon™ AF amorphous fluoroplastic resins," (Jun. 22, 2016) [online] (retrieved from https://www.chemours.com/Teflon_Industrial/en_US/assets/downloads/teflon-af-product-information.pdf), 3 pages.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

Zhang, "Teflon AF composite materials in membrane separation and molecular recognition in fluorous media," Ph.D. dissertation, University of Pittsburgh, 2013, 207 pages.

* cited by examiner

3D PRINT ADHESION REDUCTION DURING CURE PROCESS

CROSS-REFERENCE TO RELATED APPLICATION

This application claims priority to U.S. Provisional Application No. 61/992,597, filed on May 13, 2014. The disclosure of the prior application is considered part of and is incorporated by reference in the disclosure of this application.

BACKGROUND

This specification relates to three-dimensional (3D) printing.

3D printers use a variety of processes and materials for producing a 3D object. Materials used can be of the form of a resin (e.g., plastic) or other material that can be deposited so as to produce a desired 3D shape. A process of printing a 3D object can include, for example, printing a series of layers, each layer being two-dimensional (2D).

SUMMARY

In general, a system is provided for reducing adhesion during cure processing for a stereolithographic 3D printed object. The system includes a resin tank for maintaining a liquid photopolymer resin. The system further includes a light source. The system further includes a controller for selectively exposing the liquid photopolymer resin to form a solid object in the resin tank. The resin tank is constructed of a rigid material that has an oxygen permeability that is above a first threshold so as to reduce a separation force required to remove the solid object from the resin tank after curing.

These and other implementations can each optionally include one or more of the following features. The resin tank can be constructed of an amorphous fluoroplastic. The resin tank can be constructed of Teflon AF 2400. The resin tank can include one or more windows constructed of an oxygen-permeable material. A number of windows can be selected based on objects being printed and areas identified that correspond to the object that require reduced adhesion post curing. At least one window can be a rectangular-shaped window of Teflon AF 2400 that is inserted into an injection molded tank. The resin tank can include a plurality of windows on a bottom surface of the resin tank. The plurality of windows can be arranged in a pattern so as to enable transport of oxygen through the oxygen-permeable material to a specific area of the resin tank. A refractive index of a window material can be matched to a refractive index of a rigid tank material. The system can further include a resin having an oxygen diffusion coefficient above a predetermined threshold so as to facilitate quick oxygen replenishment. The resin can be silicone acrylate. The system can further include a heating element for heating resin contained in the resin tank to increase oxygen diffusion. The system can further include a simulation engine operable to estimate an oxygen content at an interface layer between the solid object and a base of the resin tank. The simulation engine is further operable to compute and identify areas where oxygen content may become exhausted during printing based on known oxygen diffusion rates through the interface layer and into the liquid photopolymer resin used to construct the solid object and the oxygen depletion rates caused by photopolymerization. The controller can be configured to dynamically adjust print parameters based on the computed and identified areas. Dynamically adjusting can include reducing a level of irradiation for a whole or part of the solid object so as to allow for oxygen replenishment in the identified areas. The resin tank can include an inner side that is fabricated with a chemical inhibitor so as to inhibit resin curing on the inner side. The resin tank can include a liquid interface layer located between the liquid photopolymer resin and a body of the resin tank. The liquid interface layer can be an optically clear material with a density that is higher than a density of the liquid photopolymer resin. The system can further include a focal element for focusing the light source at a height above the liquid interface layer. The system can further include a movement source for applying a near constant source of movement during curing.

Particular implementations may realize none, one or more of the following advantages. Issues associated with hardened material adhering to a resin tank during the printing process can be solved including, e.g., adhesion at the interface between the material to be hardened and the inside surfaces of the resin tank. Reducing adhesion at the curing interface can increase print speeds, such as by eliminating mechanical separation mechanisms (e.g., peeling, rotating, sliding) required after printing. Print accuracy can be increased due to requiring fewer mechanical forces to be applied to the print. Increased reliability can be achieved in both the print and print mechanism by eliminating mechanical points of failure (e.g., over-adhesion).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for improving 3D printing. For example, stereolithography 3D printing systems can selectively cure a liquid photopolymer resin to form a solid object. The cure process can involve exposing the photopolymer in a controlled way to a light source such as a guided laser, a dynamic mask panel (e.g., using liquid crystal displays (LCDs)), or a projector (e.g., using digital light processing (DLP)). The photopolymer can be selectively cured within a tank using an external light source. The solid object can then be removed at the end of the process.

In some implementations, techniques can be used so that issues of hardened material adhering to the resin tank during the printing process can be solved/resolved. For example, unwanted adhesion can occur at the interface between the material to be hardened and the inside surfaces of the resin tank. Reducing adhesion at the curing interface can result in a number of benefits. For example, increased print speeds can be achieved by eliminating the need for mechanical separation mechanisms (e.g., peeling, rotating, sliding). Increased print accuracy can be achieved, for example, due to fewer mechanical forces being applied to the print. Increased reliability can be achieved, for example, in both the print and print mechanism by eliminating mechanical points of failure (e.g., over-adhesion).

Stereolithography 3D printing systems can typically involve a mechanical step to separate the cured materials from the inside of the resin tank. For example, peeling, sliding, pulling, or rotating are mechanical motions that can be used to force the two surfaces apart. Mechanical separation, however, can introduce forces on the 3D print and the print mechanism, e.g., leading to print failure.

In some implementations, to reduce the mechanical forces at the separation interface, a number of techniques have been used. For example, non-stick coatings, such as Polytetrafluoroethylene (PTFE), can reduce adhesion but may not eliminate the requirement for force significantly (e.g., to break the adhesion). In some implementations, oxygen inhibition can be used in a process in which curing is inhibited by exposure to oxygen, which can create a wet uncured layer at the separation interface. Polydimethylsiloxane (PDMS), for example, can be used as an interface material due to its high oxygen permeability and optical transparency. PDMS, however, is a soft material that can require a rigid substrate to enable mechanical stability. Because the rigid substrate is typically not oxygen-permeable, oxygen within the PDMS layer cannot easily be replenished at the separation interface. Performance of the PDMS layer can therefore degrade significantly with use.

In some implementations, various techniques can be used for reducing adhesion between hardened material and the interior of the resin tank. For example, an oxygen-permeable tank and resin can be used to reduce undesirable adhesion. Further, separation force between the hardened material and the interior of the resin tank can be minimized by controlling oxygen inhibition. Various techniques can be used to control oxygen inhibition at the separation interface as will be discussed in greater detail below.

Figure 1:
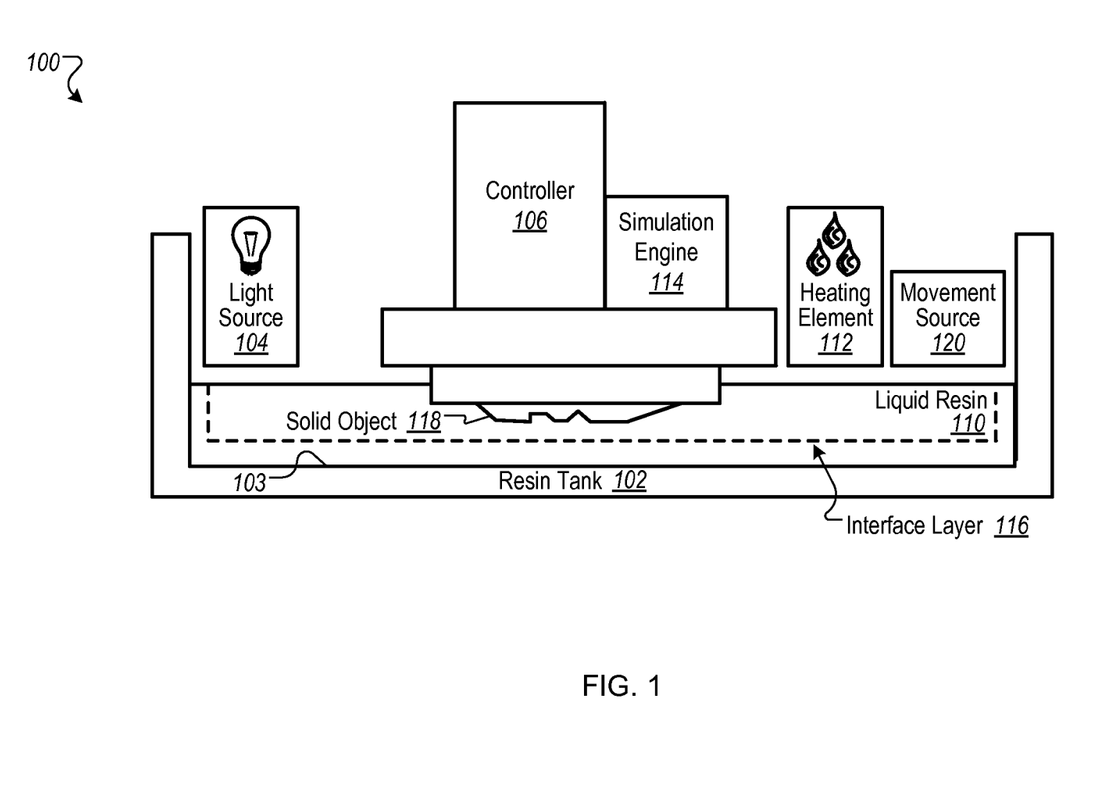
FIG. 1 shows an example system for 3D printing.

FIG. 1 shows an example system 100 for 3D printing. For example, the system 100 can be used for reducing adhesion during cure processing for a stereolithographic 3D printed object. In some implementations, the system 100 includes a resin tank 102 for maintaining a liquid photopolymer resin and a light source 104 for providing light used in the process of 3D printing. Example light sources include a guided laser, a dynamic mask panel (e.g., using LCDs), or a projector (e.g., using DLP). The system 100 includes a controller 106 for selectively exposing the liquid photopolymer resin to form a solid object 118 in the resin tank 102. In some implementations, the resin tank 102 can be constructed of a rigid material that has an oxygen permeability that is above a first threshold so as to reduce a separation force required to remove the solid object 118 from the resin tank 102 after curing. For example, the resin tank 102 can be constructed of Teflon AF 2400, some other amorphous fluoroplastic, or some other material. In some implementations, the first threshold can be substantially equivalent to an oxygen permeability level of Teflon AF 2400.

In some implementations, the resin tank 102 can include one or more windows of an oxygen-permeable material, as described below with reference to FIG. 3. For example, the number of windows can be selected based on the objects being printed. For example, a number, size and location of windows may correspond to significant features associated with a base portion of a printed object. Further, areas corresponding to the object can be identified that require reduced adhesion, post curing, such as with a simulation program. Simulation programs are discussed in greater detail below. In some implementations, at least one window can be a rectangular-shaped window of Teflon AF 2400 that is inserted into an injection molded tank. The resin tank 102 can include a plurality of windows on a bottom surface of the resin tank 102. The plurality of windows can be arranged in a pattern so as to enable transport of oxygen through the oxygen-permeable material to a specific area of the resin tank 102. In some implementations, a refractive index of a window material can be matched to a refractive index of a rigid tank material (e.g., of the resin tank 102).

In some implementations, resin tank 102 can include an inner side 103 that is fabricated with a chemical inhibitor. For example, the chemical inhibitor can inhibit resin curing on the inner side 103. Other techniques for inhibiting resin curing on the inner side 103 can also be used.

The resin tank 102 can include, for example, a liquid interface layer (e.g., interface layer 116) located between the liquid photopolymer resin and a body of the resin tank 102. In some implementations, the liquid interface layer can be an optically clear material with a density that is higher than a density of the liquid photopolymer resin. In some implementations, the system 100 can include a focal element (not shown) for focusing the light source 104 at a height above the liquid interface layer.

In some implementations, the system can include a resin (e.g., a liquid resin 110 of silicone acrylate or other material) having an oxygen diffusion coefficient above a predetermined threshold so as to facilitate quick oxygen replenishment. In some implementations the predetermined threshold is set to substantially as same level as an oxygen diffusion coefficient associated with silicone acrylate.

In some implementations, the system 100 can include a heating element 112 for heating resin contained in the resin tank 102 to increase oxygen diffusion.

In some implementations, the system 100 can include a simulation engine 114. For example, the simulation engine 114 can be operable to estimate an oxygen content at an interface layer 116 between the solid object 118 (e.g., being printed) and a base of the resin tank 102. The simulation engine 114 can also compute and identify areas where oxygen content may become exhausted during the print. For example, identification of the areas can be based on known oxygen diffusion rates through the interface layer and into the liquid photopolymer resin used to construct the solid object and the oxygen depletion rates caused by photopolymerization.

In some implementations, the controller 106 can be configured to dynamically adjust print parameters based on the computed and identified areas, such as using inputs identified by the simulation engine 114. For example, print parameters that are dynamically adjusted by the controller 106 can include parameters for reducing a level of irradiation for a whole or part of the solid object 118 so as to allow for oxygen replenishment in the identified areas. Examples of other parameters that may be adjusted include print speed, print head speed, level of irradiation, time of irradiation, time between printing successive layers and other parameters.

In some implementations, the system 100 can include a movement source 120 for applying a near constant source of movement during curing. For example, the movement source 120 cause movement of liquid resin 110 so as to improve the quality of the printing of the solid object 118. Example sources of movement provided by the movement source 120 include mechanical devices (e.g., agitators), sound waves, or other sources.

Figure 2:
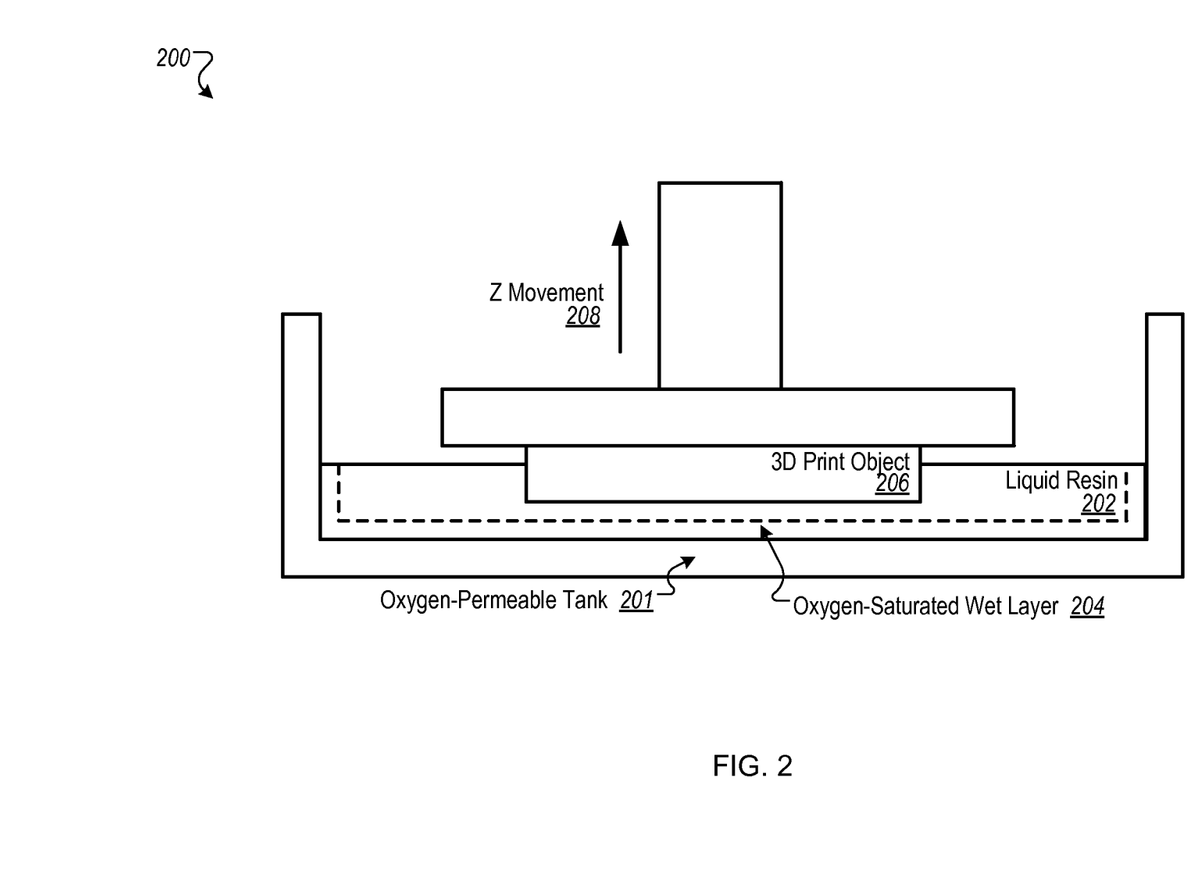
FIG. 2 shows an example system using an oxygen-permeable tank.

FIG. 2 shows an example system 200 using an oxygen-permeable tank 201. For example, the oxygen-permeable tank 201 can use or include a tank material that allows oxygen to substantially and continuously permeate (e.g., through an oxygen-saturated wet layer 204) from the outside of the tank to the inside, where the resin (e.g., liquid resin 202) resides. In some implementations, a rigid material can be used for the oxygen-permeable tank 201 so as to provide mechanical and structural characteristics to support the weight of the resin, and the rigid material can be fixed in place. The material used for the oxygen-permeable tank 201 can also allow transmission of light in the relevant part of the spectrum to enable curing. For example, the oxygen-permeable tank 201 can be made of Teflon AF 2400 or some other amorphous fluoroplastic material that is rigid, optically transparent, and has exceptionally high oxygen permeability. The oxygen-permeable tank 201 can be used, for example, to print a 3D print object 206. During printing of the 3D print object 206, components of the system 200 holding the 3D print object 206 can move in a Z movement direction 208.

In some implementations, the oxygen-permeable tank 201 can be designed in such a way to maximize oxygen transport to the areas where less adhesion is desired. For example, if adhesion needs to be reduced on the bottom of the oxygen-permeable tank 201, the outside surface of the oxygen-permeable tank 201 can be left exposed to air to enable oxygen to permeate through that surface. In some implementations, Teflon AF 2400 or some other material can be used to make the oxygen-permeable tank 201 rigid enough so that the tank does not need to be supported by another substrate layer that may block oxygen transport.

Figure 3:
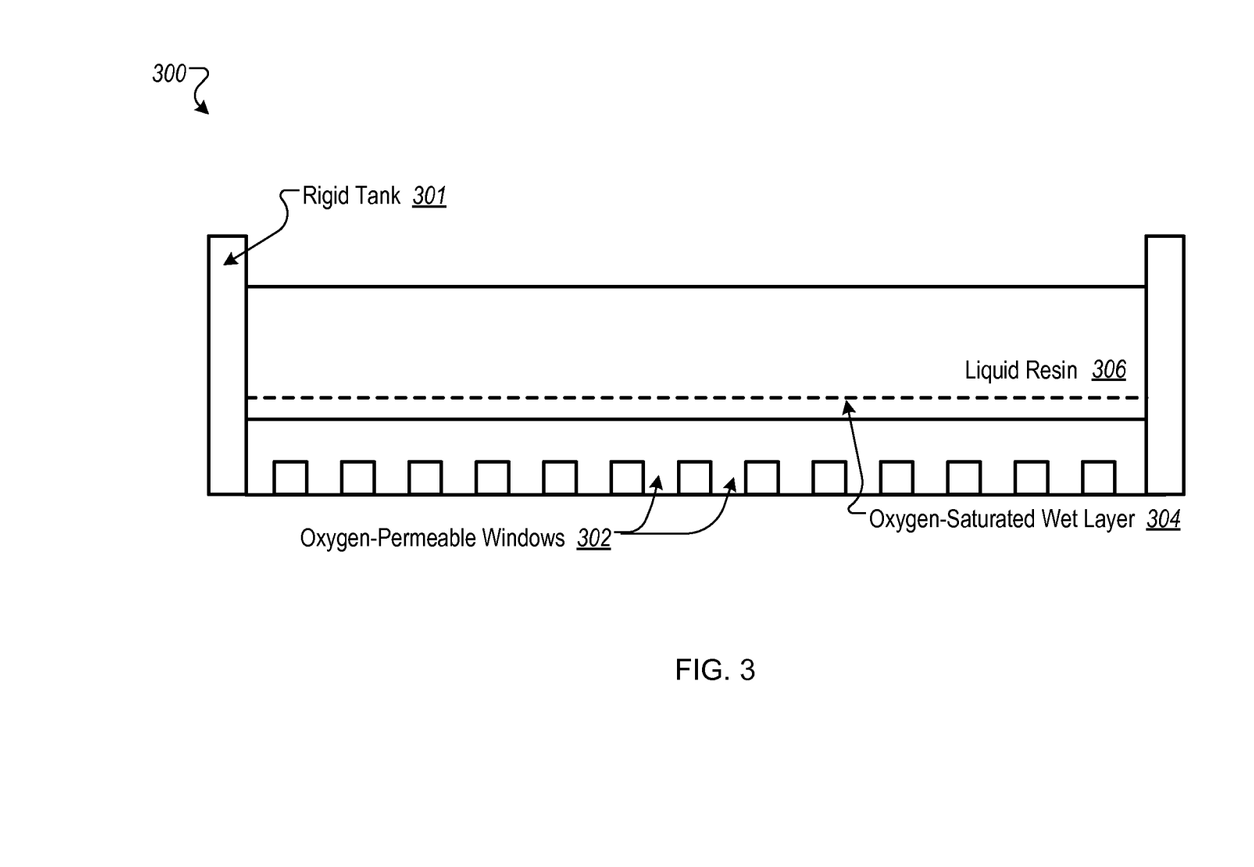
FIG. 3 shows an example system using a tank that includes windows of oxygen-permeable material.

FIG. 3 shows an example system 300 using a tank that includes windows 302 of oxygen-permeable material. For example, the tank (e.g., rigid tank 301) can incorporate the windows 302 of oxygen-permeable material at critical areas where adhesion needs to be reduced. In some implementations, the tank can be manufactured with a rectangular window of Teflon AF 2400 inserted into an injection molded tank. This approach can enable greater flexibility with the tank design and materials. The size of the windows 302 can also be scaled down and patterned so as to provide oxygen at specific areas within the tank. In some implementations, the optical transparency of the tank can be maintained by matching the refractive index of the window material with the rigid tank material.

In some implementations, oxygen-permeable resins can be used. For example, to maximize replenishment of an oxygen-saturated wet layer 304 after exposure to a light source, resin (e.g., liquid resin 306) components can be used that have a high level of oxygen permeability. In particular, to enable quick oxygen replenishment, photopolymer components with a high oxygen diffusion coefficient can be used. For example, silicone acrylate components can be used to increase the rate of oxygen replenishment and to maintain the oxygen-saturated wet layer 304. In some implementations, the resin can be heated to increase the rate of oxygen diffusion.

In some implementations, oxygen content software simulations can be used to study and estimate oxygen depletion for a given 3D print process. For example, the simulation engine 114 described above can perform the oxygen content software simulations. In addition to the interface material and resin formulation, for example, depletion of the oxygen-saturated wet layer 304 can be highly dependent on 3D print geometry and irradiation settings. In some implementations, to estimate the oxygen content at the interface layer, a software-based simulation can be performed that uses 3D geometry from a computer-aided design (CAD) model to be printed. For example, using known oxygen depletion rates caused by photo-polymerization and known oxygen diffusion rates through the interface material and into the photopolymer resin, areas in the model where oxygen content will be exhausted during the print can be computed and identified. In some implementations, to avoid full depletion of the oxygen-saturated wet layer 304 causing adhesion, printer parameters can be dynamically adjusted to reduce the amount of oxygen depletion. For example, the level of irradiation can be reduced for the whole or part of a model for a given amount of time to allow the oxygen content to replenish.

Figure 4:
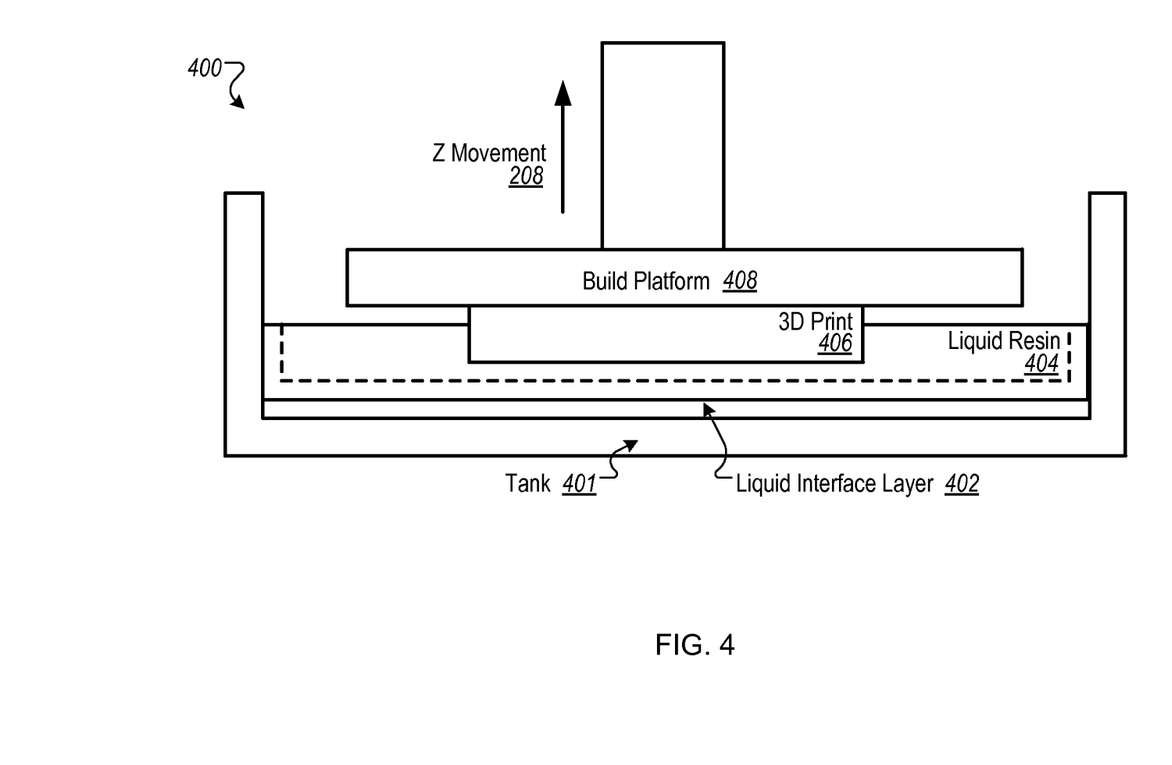
FIG. 4 shows an example system using a tank that includes a liquid interface layer.

In some implementations, chemical inhibitors can also be used to inhibit resin curing and provide an uncured wet layer of resin at the separation interface. Using this approach, for example, the inner side of the tank (e.g., rigid tank 301) can be fabricated with a chemical inhibitor to stop the photopolymer resin from curing against the tank itself FIG. 4 shows an example system 400 using a tank 401 that includes a liquid interface layer 402. For example, through the use of a liquid interface, adhesion can be reduced between the photopolymer resin and the tank 401. In this configuration, an optically clear material of higher density than the photopolymer resin (liquid resin 404) can be inserted into the tank 401. The high-density liquid can form an interface layer 402 below the photopolymer resin and can prevent adhesion to the bottom of the tank 401. The thickness of the layer can be controlled, e.g., precisely controlled by maintaining a constant amount of high-density liquid. The light source (e.g., the light source 104) can be focused above the liquid interface layer 402 on the photopolymer resin. As the print moves upwards (e.g., along the z movement direction 208), the photopolymer resin (liquid resin 404) can fill the void left behind, and a new layer can be cured. The photopolymer resin can be formulated in such a way so that the photopolymer resin is attracted to (e.g., wets to) a cured 3D print 406, while the high-density liquid does not. This wetting characteristic can prevent the high-density liquid from adhering to the 3D print 406 and can be used to maintain a consistent layer thickness.

In some implementations, various approaches can incorporate mechanical movement to prevent/or minimize adhesion at the separation interface. By applying a constant source of movement, for example, the two surfaces may not have sufficient time to cure and form a bond. For example, a resin tank can rotate while the light source and a build platform 408 remain in a fixed location. In another example, forced oscillations of either the interface layer or liquid resin 404 can be used to maintain separation between the 3D print 406 and the inside of the tank 401. In some implementations, other mechanisms, such as such as belt-driven, peeling, pulling or sliding, can be applied to maintain constant separation or for other reasons.

In some implementations, other tank implementations can be used, e.g., that use combinations of features of the systems 100, 200, 300 and 400.

Figure 5:
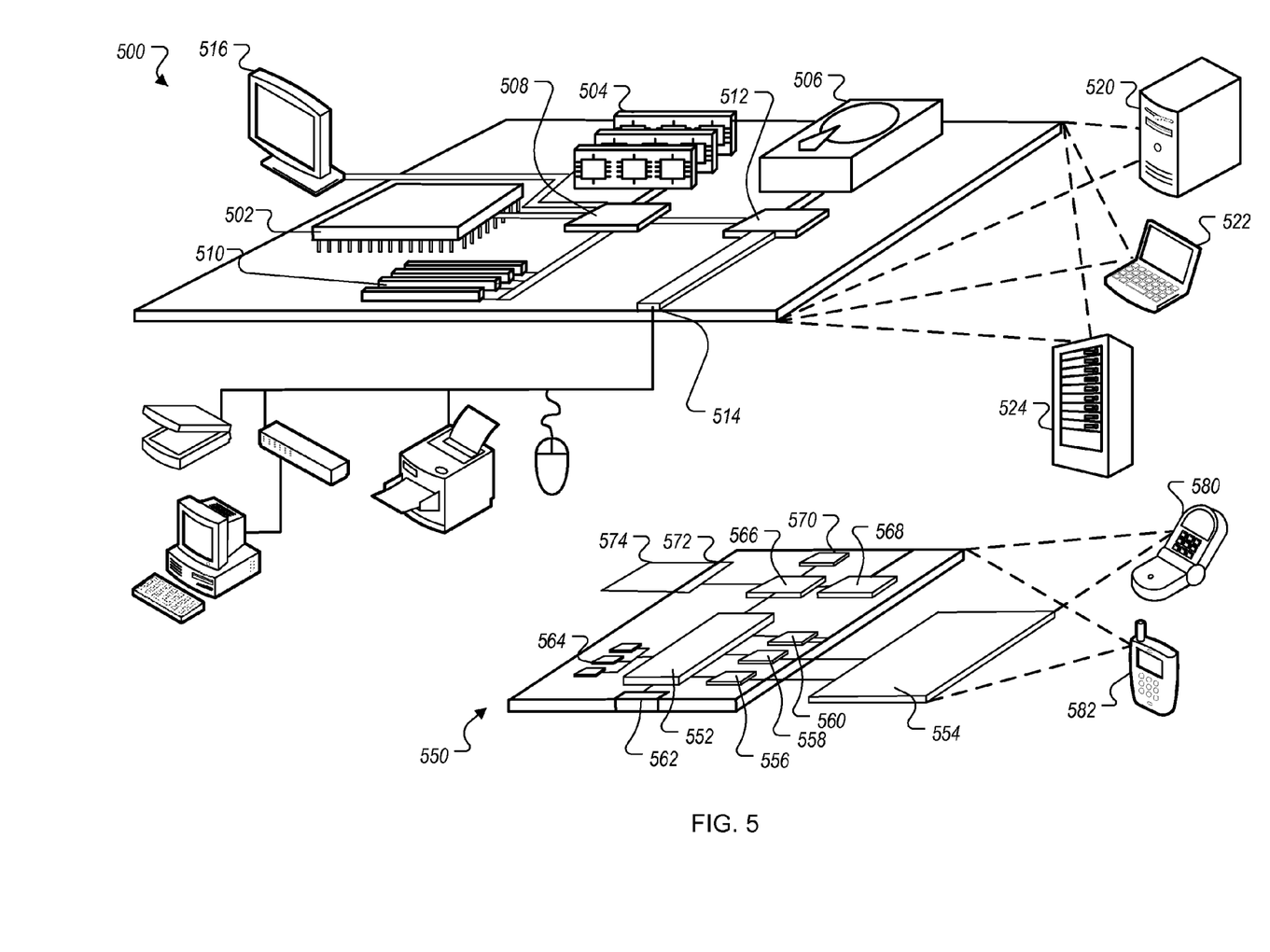
FIG. 5 is a block diagram of an example computer system that can be used to implement the methods, systems and processes described in this disclosure.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 500 is further intended to represent any other typically non-mobile devices, such as televisions or other electronic devices with one or more processers embedded therein or attached thereto. Computing device 550 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 500 includes a processor 502, memory 504, a storage device 506, a high-speed controller 508 connecting to memory 504 and high-speed expansion ports 510, and a low-speed controller 512 connecting to low-speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of duties is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed bus 514 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of computing device 550 with other devices. External interface 562 may provide, for example, for wired communication (e.g., via a docking procedure) or for wireless communication (e.g., via Bluetooth® or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to computing device 550 through expansion interface 572, which may include, for example, a subscriber identification module (SIM) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 568 (e.g., a radio-frequency transceiver). In addition, short-range communication may occur, such as using a Bluetooth®, WiFi, or other such transceiver (not shown). In addition, GPS receiver module 570 may provide additional wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smartphone 582, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for reducing adhesion during cure processing for a stereolithographic 3D printed object, the system comprising:
    an oxygen-permeable resin tank for maintaining a liquid photopolymer resin;
    a light source;
    a controller for selectively exposing the liquid photopolymer resin to form a solid object in the oxygen-permeable resin tank; and
    a simulation engine operable to estimate an oxygen content at an interface layer between the solid object and a base of the oxygen-permeable resin tank, compute and identify areas where oxygen content may become exhausted during printing based on known oxygen diffusion rates through the interface layer and into the liquid photopolymer resin used to construct the solid object and oxygen depletion rates caused by photopolymerization.

2. The system of claim 1 wherein the controller is configured to dynamically adjust print parameters based on the computed and identified areas.

3. The system of claim 2 wherein dynamically adjusting includes reducing a level of irradiation for a whole or part of the solid object so as to allow for oxygen replenishment in the identified areas.

4. The system of claim 1 wherein the oxygen-permeable resin tank includes an inner side that is fabricated with a chemical inhibitor so as to inhibit resin curing on the inner side.

5. The system of claim 1 further comprising a focal element for focusing the light source at a height above the interface layer.

6. The system of claim 1 further comprising a movement source for applying a near constant source of movement during curing.

7. The system of claim 1 wherein the oxygen-permeable resin tank is constructed of an amorphous fluoroplastic.

8. The system of claim 1 wherein the oxygen-permeable resin tank includes a plurality of windows of an oxygen-permeable material on a bottom surface of the oxygen-permeable resin tank.

9. The system of claim 8 wherein a number of the plurality of windows is selected based on objects being printed and areas identified that correspond to the solid object that require reduced adhesion post curing.

10. The system of claim 8 wherein at least one window of the plurality of windows is a rectangular-shaped window of an amorphous fluoroplastic that is inserted into an injection molded tank.

11. The system of claim 8 wherein the plurality of windows are arranged in a pattern so as to enable transport of oxygen through the oxygen-permeable material to a specific area of the oxygen-permeable resin tank.

12. The system of claim 8 wherein a refractive index of a window material is matched to a refractive index of a rigid tank material.

13. The system of claim 1 further comprising the liquid photopolymer resin having an oxygen diffusion coefficient above a predetermined threshold so as to facilitate oxygen replenishment, wherein the predetermined threshold corresponds to an oxygen diffusion coefficient associated with silicone acrylate.

14. The system of claim 13 wherein the liquid photopolymer resin is silicone acrylate.

15. The system of claim 1 further comprising a heating element for heating resin contained in the oxygen-permeable resin tank to increase oxygen diffusion.

* * * * *